United States Patent [19]

Matsuda et al.

[11] Patent Number: 4,650,021

[45] Date of Patent: Mar. 17, 1987

[54] REAR WHEEL STEERING DEVICE FOR MOTORCYCLES HAVING LIMITING MEANS

[75] Inventors: Atsushi Matsuda, Iwata; Toshiyuki Sato, Fukuroi, both of Japan

[73] Assignee: Yamaha Hatsudoki Kabushiki Kaisha, Iwata, Japan

[21] Appl. No.: 827,805

[22] Filed: Feb. 7, 1986

[30] Foreign Application Priority Data

Feb. 8, 1985 [JP] Japan .................................. 60-21805

[51] Int. Cl.$^4$ ............................................. B62K 21/00
[52] U.S. Cl. ...................................... 180/219; 280/91
[58] Field of Search ............... 180/219, 220, 222, 223, 180/224, 227, 140; 280/267, 269, 266, 91

[56] References Cited

U.S. PATENT DOCUMENTS

| | | | |
|---|---|---|---|
| 602,034 | 4/1898 | Murphy | 280/266 |
| 2,791,438 | 5/1957 | Ruf | 280/91 |
| 4,157,739 | 6/1979 | Frye | 180/224 |
| 4,557,493 | 12/1985 | Sano et al. | 280/91 |

Primary Examiner—John A. Pekar
Attorney, Agent, or Firm—Ernest A. Beutler

[57] ABSTRACT

A steering arrangement for motorcycles wherein the rear wheel is supported for steering movement and is mechanically coupled to the mechanism for steering the front wheel so that both wheels will be steered in unison. The mechanism includes means for limiting the steering movement of the rear wheel and disabling the rear wheel steering upon failure.

14 Claims, 6 Drawing Figures

REAR WHEEL STEERING DEVICE FOR MOTORCYCLES HAVING LIMITING MEANS

BACKGROUND OF THE INVENTION

This invention relates to a rear wheel steering device for motorcycles and more particularly to a device for disabling the steering movement of the rear wheel upon failure.

Most vehicles intended for use on public roads for transportation are designed so that they include one or more steered front wheels and one or more non-steered rear wheels. Motorcycles are typical examples of this type of vehicle wherein there is a steered front wheel and a non-steered driven rear wheel. Although such an arrangement offers the advantage of simplicity, it does not necessarily offer the best handling when rounding curves or changing directions. That is, when turning, the front wheel is steered into the direction of the turn but the rear wheel is still pointed in a direction tending to go straight ahead. This can cause difficulties in handling.

It is, therefore, a principal object of this invention to provide an improved steering arrangement for vehicles wherein both the front and rear wheels are steered.

It is a further object of this invention to provide a steering mechanism for vehicles that will improve their handling.

Although it is desirable under certain conditions to permit steering of the rear wheel, if the mechanism for steering the rear wheel fails, the rear wheel may have uncontrolled movement and this is obviously undesirable.

It is, therefore, a still further object of this invention to provide an improved rear wheel steering device which limits the degree of steering movement of the rear wheel.

It is a still further object of this invention to provide a rear wheel steering device wherein the steering movement of the rear wheel is disabled if a failure occurs.

SUMMARY OF THE INVENTION

This invention is adapted to be embodied in a vehicle having at least one dirigible front wheel steered by an operator and at least one rear wheel. Means are provided for supporting the rear wheel for steering movement and for coupling the front wheel to the rear wheel for simultaneous steering movement.

In accordance with a first feature of the invention, means are provided for limiting the degree of steering movement of the rear wheel.

In accordance with another feature of the invention, means are provided for disabling the rear wheel steering movement upon failure.

BRIEF DESCRIPTION OF THE DRAWINGS

FIG. 5 shows the arrangement in the normal operating condition and FIG. 6 shows the steering limiting mechanism in its limiting condition.

DETAILED DESCRIPTION OF THE PREFERRED EMBODIMENT

Figure 1:
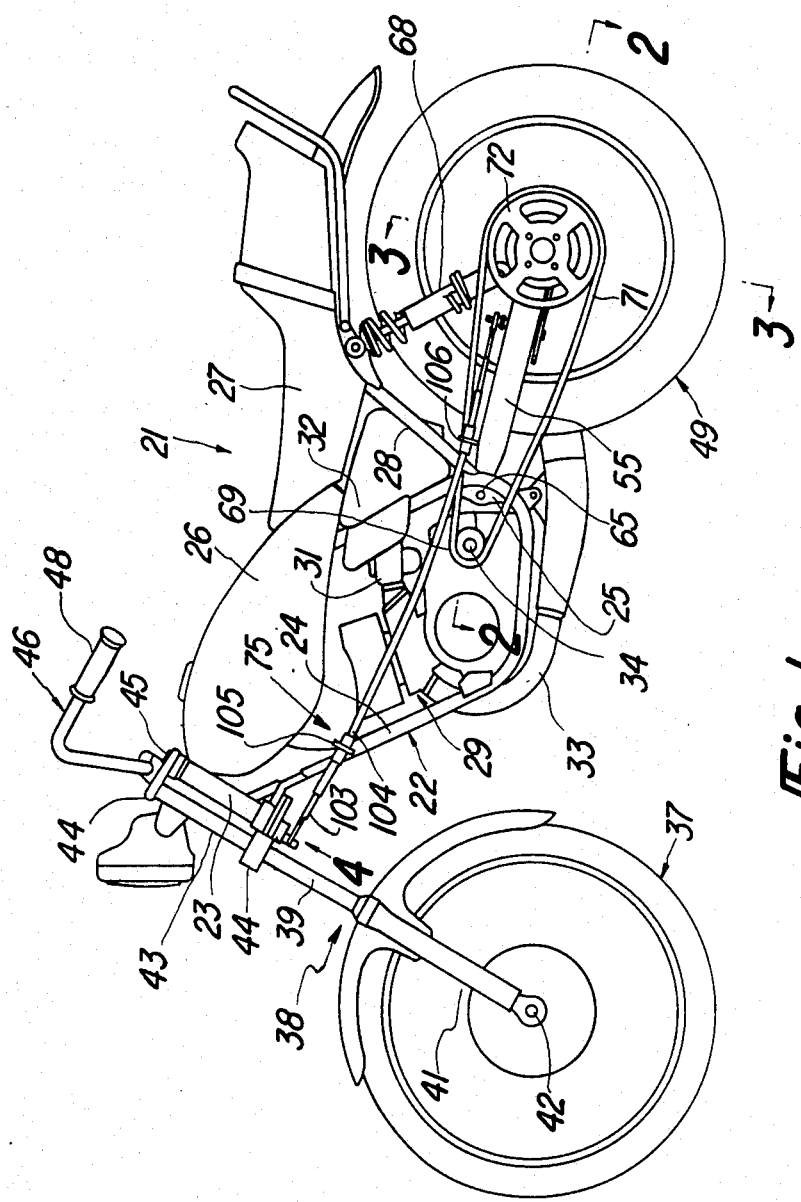
FIG. 1 is a side elevational view of a motorcycle constructed in accordance with an embodiment of the invention.

Referring first primarily to FIG. 1, a motorcycle constructed in accordance with this invention is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 20, a down tube 24 and a bracket 25 that is affixed to the down tube and a rearwardly and downwardly projecting portion of the main tube. A fuel tank 26 is supported on the main tube and is positioned forwardly of a seat 27 that is supported on a seat rail and a seat pillar rail 28 of the frame assembly 22. Since the frame assembly per se forms no part of the invention, a further description of it is believed to be unnecessary.

An internal combustion engine, indicated generally by the reference numeral 29, is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetors 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft 34 at any of a plurality of selected speed ratios.

A front wheel 37 is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system 41 that carries the front wheel 37 for rotation about an axis 42 at its lower end. The system 41 is supported for vertical movement relative to an upper portion 43 so as to accommodate controlled suspension movement for the front wheel 37.

Upper and lower brackets 44 connect the front fork upper portion 39 to a steering shaft 45 that is journaled for rotation about a front steering axis is journaled in the head pipe 23. A handlebar assembly 46 is connected to the brackets 44 and steering shaft 45 by a mechanism 47. The handlebar 46 carries hand grips 48 at its outer end. It should be readily apparent that a rider positioned on the seat 27 may steer the front wheel 37 through the hand grips 48 and handlebar 46.

A driven rear wheel assembly, indicated generally by the reference numeral 49, is carried at the rear end of the frame assembly 22 in a manner to be described. The rear wheel 49 includes a tire 51 that is mounted on a rim 52 that is connected to a hub portion 54.

It should be noted that the motorcycle 21 as thus far described is generally conventional in configuration and, for that reason, only the general construction has been described in detail.

Figure 2:
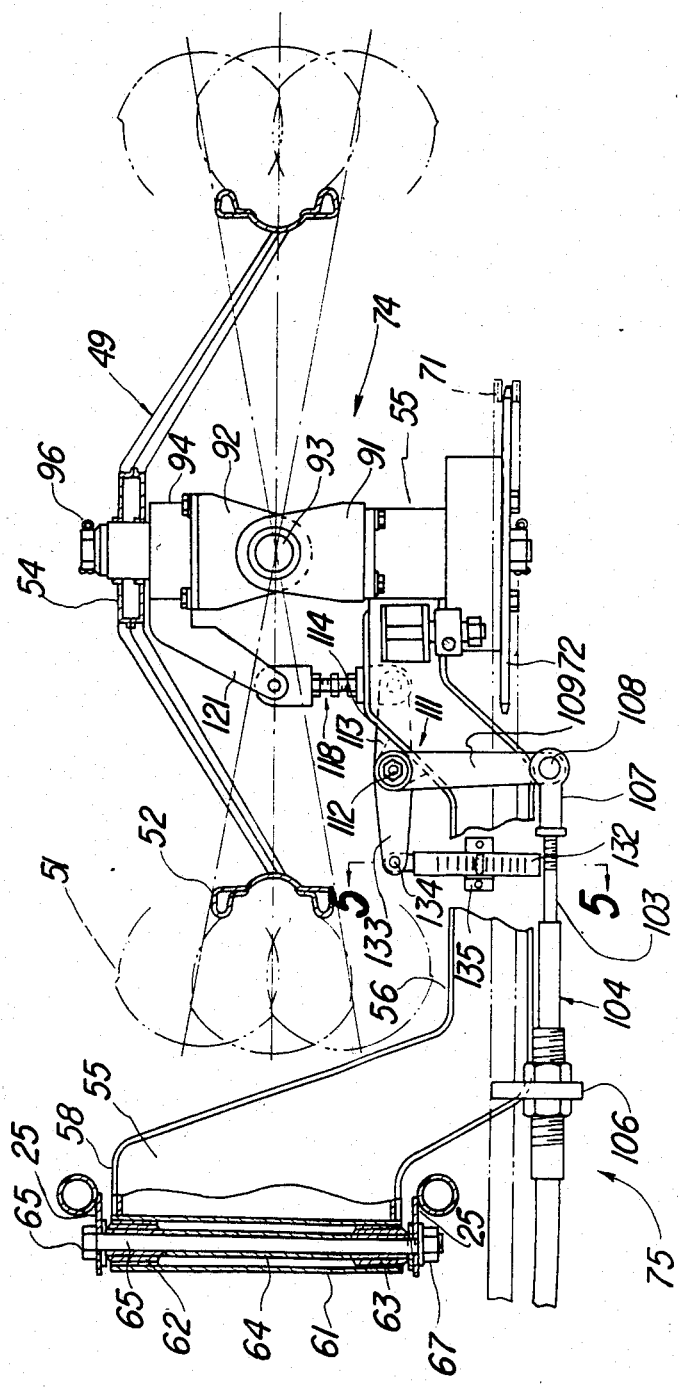
FIG. 2 is an enlarged cross-sectional view taken along the line 2—2 of FIG. 1.

The rear wheel 49 is supported for suspension movement relative to the frame 22 by means that include a trailing arm assembly, indicated generally by the reference numeral 55 and shown in most detail in FIG. 2. Because of differences which will be described, the trailing arm assembly 53 includes one rearwardly extending arm portion 56 that lies on only one side of the rear wheel assembly 49 and which supports the rear wheel assembly by means of a hub carrier 57 that is fixed at its trailing end in a manner to be described. Forwardly of the rearwardly extending portion 56, the trailing arm 55 has a main portion 58 that extends substantially across the width of the motorcycle between the brackets 25 and which is formed of a welded up box section. This box section has a tube 61 carried at its forward end, which tube is, in turn, journaled on a pair of axial spaced bushings 62 and 63 that are, in turn, journaled on a shaft 64 that is carried in the brackets 25. The shaft 64 is held in place by means of an elongated bolt 65 that extends through the interior of the shaft 64 and which is held in place by a nut 66.

The suspension travel of the rear wheel 49 and trailing arm 55 are controlled by a combined coil spring and shock absorber unit 68 that is loaded between the rear end of the arm portion 56 and the frame 22 at a point contiguous to where the seat pillar 28 joins the seat rail.

The rear wheel 49 is driven and to this end a driving sprocket 69 is affixed to the engine transmission output shaft 34. A driving chain 71 encircles the sprocket 69 and a driven sprocket 72 that is affixed for rotation with the rear wheel 49 in a manner which will be described.

In addition to being driven and supported for suspension movement, the rear wheel assembly 49 is also supported for steering movement by means of a steering support, indicated generally by the reference numeral 74. The steering support 74 is designed so as to provide a steering axis that passes through the transverse center of the rear wheel assembly 49 and which lies on a plane passing through the center of the motorcycle 21 and containing the front wheel steering axis. The rear wheel steering axis extends vertically.

The steering of the rear wheel 49 about its steering axis is controlled by means of a steering control mechanism, indicated generally by the reference numeral 75 which connects the front wheel steering mechanism with the rear wheel steering support mechanism 74 in a manner to be described.

Figure 3:
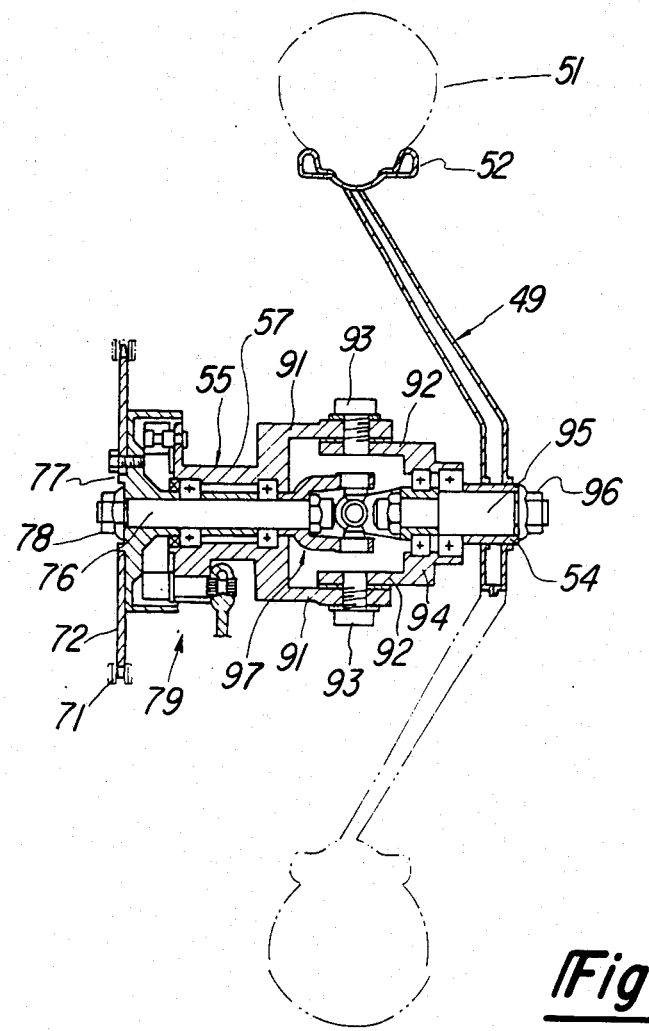
FIG. 3 is an enlarged cross-sectional view taken along the line 3—3 of FIG. 1.

Referring now primarily to FIGS. 2 and 3, the rear wheel steering support mechanism 74 will be described in detail. The hub carrier 57 has a pair of spaced apart bearings that rotatably journal a shaft 76. The shaft 76 has a splined connection to a hub member 77 which is, in turn, affixed to the sprocket 72 by means of bolt assemblies. The sprocket 72 and hub member 77 are axially affixed to the shaft 76 by means of a nut 78.

The hub member 77 forms a portion of a drum brake assembly, indicated by the reference numeral 79 and which may be of any known type.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49.

The further bifurcated member 92 is affixed to a second hub carrier 94 which, in turn, journals a shaft 95 by means of a pair of spaced bearings. The shaft 95 is non-rotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respectively members affixed to the shafts 76 and 95. The universal joint 97 has its pivotal axis lying within the plane on the rear wheel steering axis so that the steering movement of the rear wheel assembly 49 will not interfere with the driving forces transmitted to the rear wheel through the universal joint 97.

Figure 4:
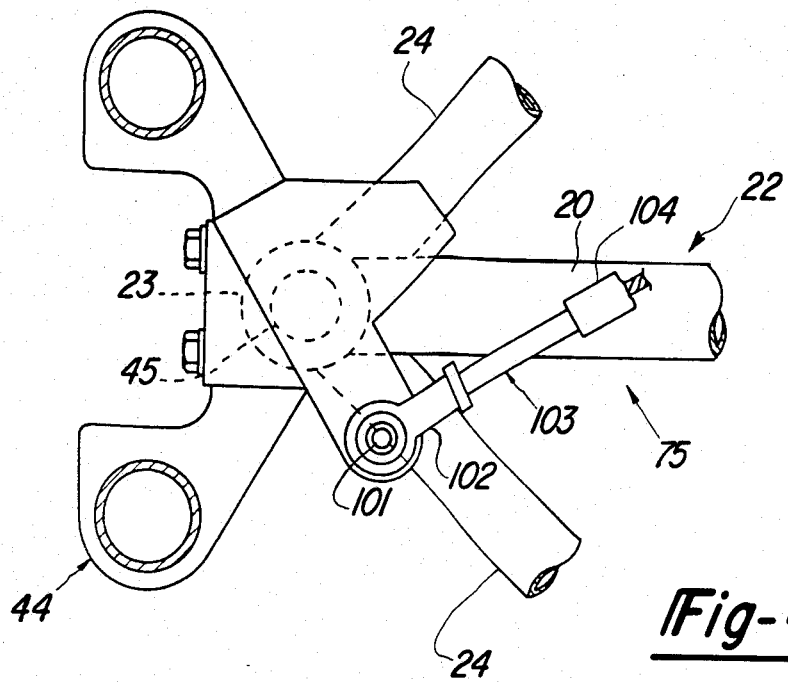
FIG. 4 is an enlarged view looking in the direction of the arrow 4 in FIG. 1.

The steering control mechanism 75 is provided for mechanically coupling the front wheel steering mechanism to the mechanism for steering the rear wheel 74 so that both wheels will be steered in unison. This mechanism includes a pin 101 (FIG. 4) that is affixed relative to the lowermost fork bracket 44 at a point offset from the front steering axis. A trunion member 102 connects the pin 101 to one end of a flexible transmitter 103 that is contained within a protective sheath 104. The adjacent forward end of the protective sheath 104 is carried by the down tube 24 and specifically by means of a bracket 105 that is connected to it.

The rear end of the protective sheath 104 is fixed adjustably to a bracket 106 carried by the trailing arm assembly 55. The rear end of the wire actuator 103 is connected by means of a trunion 107 (FIG. 2) and pivot pin 108 to one arm 109 of a bellcrank assembly 111. The bellcrank assembly 111 is supported for pivotal movement about a vertically extending axis by means of a pivot pin 112 that is carried by a bracket 113 that is affixed to the trailing arm portion 56. Another arm 114 of the bellcrank 111 is connected to the steering axis 121 by means of a turnbuckle assembly 118 so as to permit adjustment. A steering arm 121 is formed integrally with or affixed to the hub carrier 94.

The steering operation of this embodiment will now be described. If the rider steers the front wheel 37 by rotating the handlebars 46 and front wheel 37, there will be a force exerted on the flexible transmitter 103. This places a force on the bellcrank 111 and specifically its arm 109 so as to pivot it about the pivot pin 112. The arm 115 then exerts a force through the turn buckle 118 so as to pivot the steering arm 112 and hub carrier 94 about the rear steering axis. Thus, both the front and rear wheels will be steered. The mechanical arrangement of the linkage system is such, however, that the angle of steering movement of the rear wheel 49 will be less than the angle of steering movement of the front wheel 37, for example, about 20% of the front wheel steering.

Because of the use of the flexible transmitter for transmitting the steering motion from the front to rear wheel, the suspension movement of the rear wheel 49 is easily accommodated and there will be no feedback or steering of the rear wheel 49 merely due to the suspension movement per se.

Figure 5:
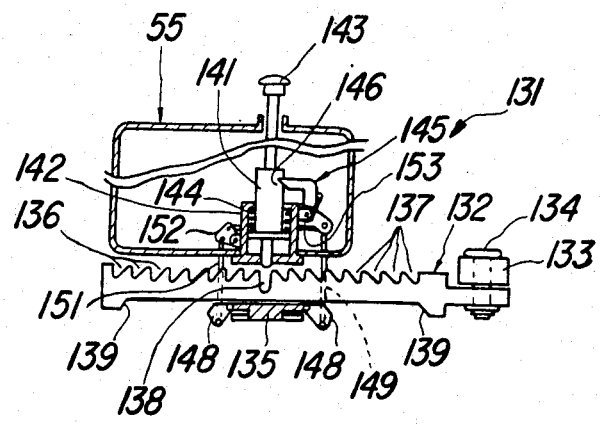
FIGS. 5 and 6 are cross-sectional views taken along the line 5—5 of FIG. 2 and show the mechanism for limiting the degree of steering movement of the rear wheel.
Figure 6:
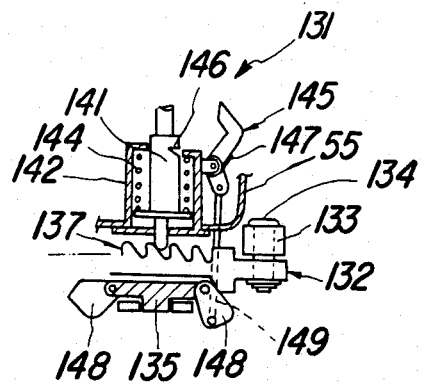

Although it is desirable in many instances to have the rear wheel 49 steered in addition to the front wheel 37, there are some conditions wherein the degree of steering movement of the rear wheel 49 should be limited. Also, if there is a failure in the rear wheel steering mechanism 75, it is desired to lock the rear wheel 49 against any steering movement. For example, if the flexible transmitter 103 or any of the linkage breaks it is desirable to disable the rear wheel steering. A mechanism, indicated generally by the reference numeral 131 and shown in most detail in FIGS. 2, 5 and 6 is provided for limiting the degree of steering movement of the rear wheel 49 and for disabling its steering upon failure.

The limiting and disabling mechanism 131 includes a rack-like member 132 that is pivotally connected to an extending arm portion 133 of the bellcrank 111 by means of a pivot pin 134. The rack-like member 132 is supported for sliding movement in a casing assembly 135 which is, in turn, affixed to the trailing arm 55. The rack-like member 132 has a first set of teeth 136 and a second set of teeth 137 for a purpose to be described with a notch 138 being formed between the teeth 136 and 137. In addition, the lower surface of the rack-like member 132 is formed with a pair of depending limiting cam surfaces 139.

A latching pin 141 is slidably supported within a cage 142 that is fixed internally in the hollow interior of the trailing arm 55. The locking pin 141 has a knob 132 affixed to an upstanding portion and is normally biased by means of a spring 144 to a downward or locked position.

The locking pin 141 is held in its upper, released position, by means of a latch, indicated generally by the reference numeral 145, which comprises a pivoted member supported on the cage 141 and which is cooperable with a latching recess 146 formed in the locking pin 141. A torsional spring 147 normally urges the latching member 145 to its engaged position.

A pair of latch actuating cams 148 are pivotally supported on the member 135 adjacent the underside of the rack-like member 132. One of these latching actuating members 148 is connected directly to the arm of the latching member 145 by means of a link 149. The opposite latching actuating member 148 is connected to the latching member arm by means of a link 151, bellcrank 152 and further link 153.

FIG. 5 shows the limiting and disabling device 131 in its normal position wherein rear wheel steering is permitted. It should be noted that the rack-like member 132 will slide back and forth within the casing 135 when the rear wheel 49 is steered. If, however, there is a failure in the rear wheel steering mechanism 75 and the rear wheel pivots excessively, one of the limiting cam surfaces 139 will contact either of the latch actuating members 148 and they will be pivoted from the position shown in FIG. 5 to a released position. FIG. 6 shows the operation when this occurs. The directly coupled latch actuating member 148 is shown as being actuated by the cam surface 139 in this figure and the latching member 145 is pivoted to a released position. When this occurs, the coil spring 144 can urge the latching pin 141 downwardly into engagement with the teeth 137. It should be noted that the teeth 137 are configured so that the rack-like member 132 cannot move further in the steering direction but can return to its normal straight ahead position. Thus, the rear wheel 49 cannot pivot further under this condition but can return to its normal straight ahead position. When the rear wheel 49 is moved to its normal position, the spring 144 will urge the latching pin 141 downwardly into engagement with the central groove 138 wherein further rear wheel steering is prohibited.

It should be noted that the rear wheel steering cam surfaces 139 are positioned so that the amount of rear wheel steering required to activate the disabling device 131 will indicate a condition wherein this is necessary, for example, when more than normal rar wheel steering movements are being made to indicate that there is a failure.

If the operator desires to reinitiate rear wheel steering after the defect has been rectified, he merely pulls the knob 143 and locking pin 141 upwardly when the rear wheel is in its centered position. This will cause the latch 145 to re-engage with the notch 146 and permit the steering in the manner aforedescribed.

It should be readily apparent that the described construction is highly useful in permitting rear wheel steering and yet limiting the degree of rear wheel steering and disabling the rear wheel steering upon failure. Although an embodiment of the invention has been illustrated and described, various changes and modifications may be made without departing from the spirit and scope of the invention, as defined by the appended claims.

We claim:

1. A motorcycle having only one dirigible front wheel steered by an operator and one rear wheel, the improvement comprising means for supporting said rear wheel for steering movement, means for mechanically coupling said front and said rear wheels for simultaneous steering movement and means for limiting the degree of steering movement of said rear wheel.

2. A motorcycle as set forth in claim 1 wherein the means for limiting the degree of steering movement of the rear wheel limits the degree of steering movement in both directions.

3. A motorcycle as set forth in claim 2, wherein the means for limiting the degree of steering movement of the rear wheel permits return of the rear wheel to its non-steered condition.

4. A motorcycle as set forth in claim 3 wherein the means for limiting the degree of steering movement of the rear wheel includes a ratchet mechanism.

5. A motorcycle as set forth in claim 4 wherein the ratchet mechanism disables further steering of the rear wheel from its neutral position once it has been activated.

6. A motorcycle as set forth in claim 1 further including operator controlled means for steering the front wheel.

7. A motorcycle as set forth in claim 6 wherein the means for mechanically coupling the front and rear wheel couples the rear wheel steering mechanism to the front wheel steering mechanism.

8. A motorcycle as set forth in claim 7 wherein the coupling means comprises a linkage system.

9. A motorcycle as set forth in claim 8 wherein the front and rear wheels are supported for suspension movement.

10. A motorcycle as set forth in claim 8 wherein at least one of the steered wheels is driven.

11. A motorcycle as set forth in claim 10 wherein the front and rear wheels are supported for suspension movement.

12. A motorcycle as set forth in claim 11 wherein the rear wheel is the driven wheel.

13. A vehicle having at least one dirigible front wheel steered by an operator and at least one rear wheel, the improvement comprising means for supporting said rear wheel for steering movement, means for mechanically coupling said front and said rear wheels for simultaneous steering movement, and means for disabling the steering movement of said rear wheel in response to a failure in the rear wheel steering mechanism.

14. A vehicle as set forth in claim 13 wherein the failure is sensed by steering movement of the rear wheel more than a predetermined amount.

* * * * *